United States Patent Office 3,217,470
Patented Nov. 16, 1965

3,217,470
AIR PURIFIER CONSTRUCTION
William A. Omohundro, Westport, Conn., assignor to General Electric Company, a corporation of New York
Filed Sept. 3, 1963, Ser. No. 306,166
5 Claims. (Cl. 55—279)

This invention relates to apparatus for the purification of air and more particularly to electric room air purifiers of the type especially suited for use in locations where space is a problem.

The basic components of an electric air purifier are a fan, a motor, a filtering arrangement, and optionally an air purifying or ion producing source. It is of course desirable that these components be arranged to provide a maximum output of purified air from a minimum sized package. At the same time, it is essential that the device have a convenient shape to fit within a desired space and accomplish the desired function. Perhaps the limiting factor in obtaining compact construction of a purifier is the filter arrangement in that all air should pass through the filter to provide effective purifying and the filter should be sufficiently large to provide adequate capacity so that frequent replacement or cleaning is not required.

Accordingly, it is a primary object of this invention to provide an improved air purifier which has a large filter area within a compact space and which is capable of maximizing purified air output.

It is a further object of this invention to provide an air purifier with an improved filter construction and a uniquely arranged bacteria killing and ion producing device.

It is another object of this invention to provide an improved compact air purifier having a large filter area arranged so that all discharge surfaces of the filter are exposed to the output of an air purifying lamp.

Briefly stated, the electric air purifier of the invention includes a motor support plate adapted to support a pair of electric motors positioned in laterally spaced relation on one side of the plate each with its drive shaft extending through an aperture in the plate. A pair of fans positioned on the other side of the plate mounted on the shafts draw air through the apertures. Tubular shaped air purifying filter means are positioned around the motors with one end of the filter means compressed against the plate surrounding the aperture by a substantially imperforate plate pressed against the opposite end of the filter, so that air drawn through the aperture by the fan must pass through the tubular filter surface. The use of the tubular shaped filter means positioned as described with the two motor-fan units provides large filter surface areas in a relatively compact space with high air output.

As another embodiment of the invention, an air purifying lamp may be uniquely positioned within the filter so that all of the discharge surfaces of the filter means are exposed to the lamp. With the proper selection of lamp and filter shapes, the lamp can be incorporated into the purifier without increasing the exterior size of the device. The lamp may also be employed in an ion producing device to obtain an ionized air stream from the purifier.

Further features, objects and advantages of the invention will become apparent with reference to the following specification and drawings in which.

Figure 1:
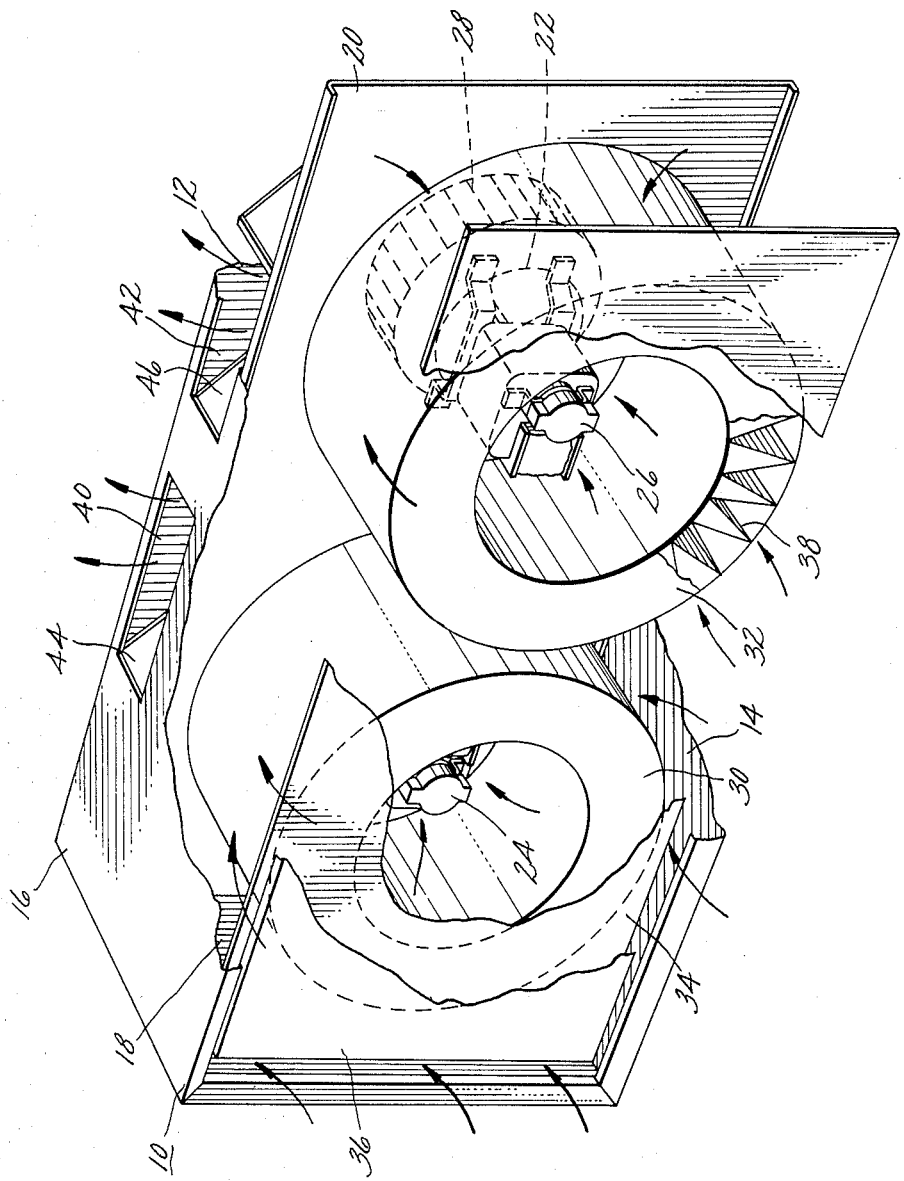
FIG. 1 is a perspective partially cut away view of the air purifier of the invention.

Referring now to the drawings, there is shown in FIG. 1 an air purifier including a relatively elongated housing 10 having a rear wall 12, bottom side wall 14, top side wall 16, a left side wall 18, and a similar right side wall (not shown). It can be seen from the drawings that the front to rear dimension of side walls, or in other words the depth of the housing, is less than the shorter dimension of the rear wall 12, or in other words, less than the height of the housing.

The side walls of the housing 10 define a rectangular opening into which is placed a rectangular support plate 20 extending between the side walls in parallel relation to rear wall 12. This support plate may be secured within the housing in any suitable fashion. The support plate 20 is formed with a pair of centrally located apertures arranged in laterally spaced relation, one of the apertures being shown in dotted lines at 22.

A pair of shaded pole or other suitable type motors 24 and 26 are mounted by suitable brackets on the support plate 20 and positioned on the front side of the plate 20 with their drive shafts extending through the adjacent plate apertures. A pair of centrifugal fans, one of which is shown at 28, are positioned on the opposite side of the plate 20 in the compartment formed by the plate and the rear portion of the housing. Each fan is of course mounted on a respective one of the motor drive shafts.

In accordance with the invention, a pair of tubular shaped air filters 30 and 32 having circular cross-sections are positioned in the housing 10, each with one of their ends in contact with support plate 20. Each of the filters surrounds a respective one of the motors and a respective one of the apertures in plate 20. The filters are compressed against the support plate 20 by an imperforate plate 34, which is of a size sufficient to completely cover the front ends of the filters so that all air passing through the filters to the fans must pass through one of the annular filter surfaces. The imperforate plate 34 is preferably given a rectangular shape slightly smaller than the opening defined by the housing side walls with the result that plate 34 in cooperation with the housing defines a rectangular perimetric air inlet to the housing. Thus, air is drawn through the filters 30 and 32 in a smooth and evenly distributed manner.

Imperforate plate 34 is preferably connected to support plate 20 by suitable brackets and bolts or other fastening devices (not shown). In this manner, plate 34 is utilized to axially compress the filters to obtain a tight seal between the ends of the filters and the adjacent plates. In this connection, the ends of the filters may be provided with a layer of resilient material to further improve the seal.

For appearance purposes, the purifier may also be provided with a front cover plate 36 having a rectangular shape adapted to fit within the front opening and to be spaced from the side walls of the housing to further define the air inlet in cooperation with the plate 34. Cover plate 36 may be removably secured to the surrounding housing in any suitable fashion.

The filters 30 and 32 are preferably formed of a pleated material such as glass fiber to remove dirt particles and other foreign matter and may also contain activated charcoal to remove odors. The charcoal filter can be a separate layer mounted between the motor and the glass fiber material or its can be encapsulated with the glass fiber into a single unit. Alternatively, the mechanical glass fiber filter can have charcoal impregnated throughout so that a single filter serves both functions of filtering dust and removing odors. A portion of filter 32 is broken away in FIG. 1 to show the pleated construction represented by the lines at 38.

A pair of air outlets 40 and 42 are formed in the rear portion of the top side wall 16. Each of the outlets cooperates with a respective one of the scrolls 44 and 46 defining the air path around the fans. Thus, it will be appreciated that in operation of the air purifier, air is drawn in through the front portion of the purifier, filtered as it is drawn through the filters 30 and 32, drawn through the apertures in support plate 20 and finally exhausted by the fans upwardly through air outlets 40 and 42.

One of the prime advantages of the improved air purifier described in the foregoing paragraphs, is the large filter surface area which is obtained from a relatively small package. For example, the tubular shaped filters having the axial dimension shown provide a much greater filter surface area than would be provided by the more conventional arrangement of simply using a planar filter mounted in the front wall of the purifier. Further, the effective filtering surface area is maximized by utilizing the pleated type filter. Another advantage of the arrangement shown is that the filters are compressed between two plates so that effectively all air reaching the fans must pass through the filters.

A further important advantage of the arrangement shown is that utilizing two motors and fans and filters, as opposed to using a single unit which would provide comparable filter air output, provides a powerful package which is a much more usable device. For example, if the air purifier is simply to be used within a room for purifying the normal room air, it is generally desirable that the device be as unobtrusive and compact as possible. The arrangement shown is very handy in this respect in that its slimp configuration can be unobtrusively placed against a wall either on the floor or on a relatively narrow shelf. In addition, to obtain certain air outputs, the double motor and fan unit is less expensive than an equivalent single motor fan unit.

The described air purifier is also uniquely adapted for use in a ductless hood over a cooking surface. In such application, the unit is positioned with the front wall 36 facing downwardly toward the stove surface units and the top wall 16 faces toward the surrounding room so that the air is directed outwardly into the room through the outlets 40 and 42. The air purifier is particularly suited for use in conjunction with a stove in that the cover 36 prevents grease or other spattering material from flying directly into the air purifier. Also, the unique perimetric air inlet arrangement is advantageous for such use. Since the inlet is a relatively narrow channel, the velocity of the air stream increases greatly as the air enters the purifier. Such an arrangement has great advantage for obtaining proper smoke and steam dissipation. Also the inlet tends to create somewhat of an invisible suctional curtain extending downwardly toward the surface units of the stove. This curtain tends to prevent the air above the stove from escaping into the surrounding room, and instead all of the air from the stove is drawn through the purifier.

Figure 2:
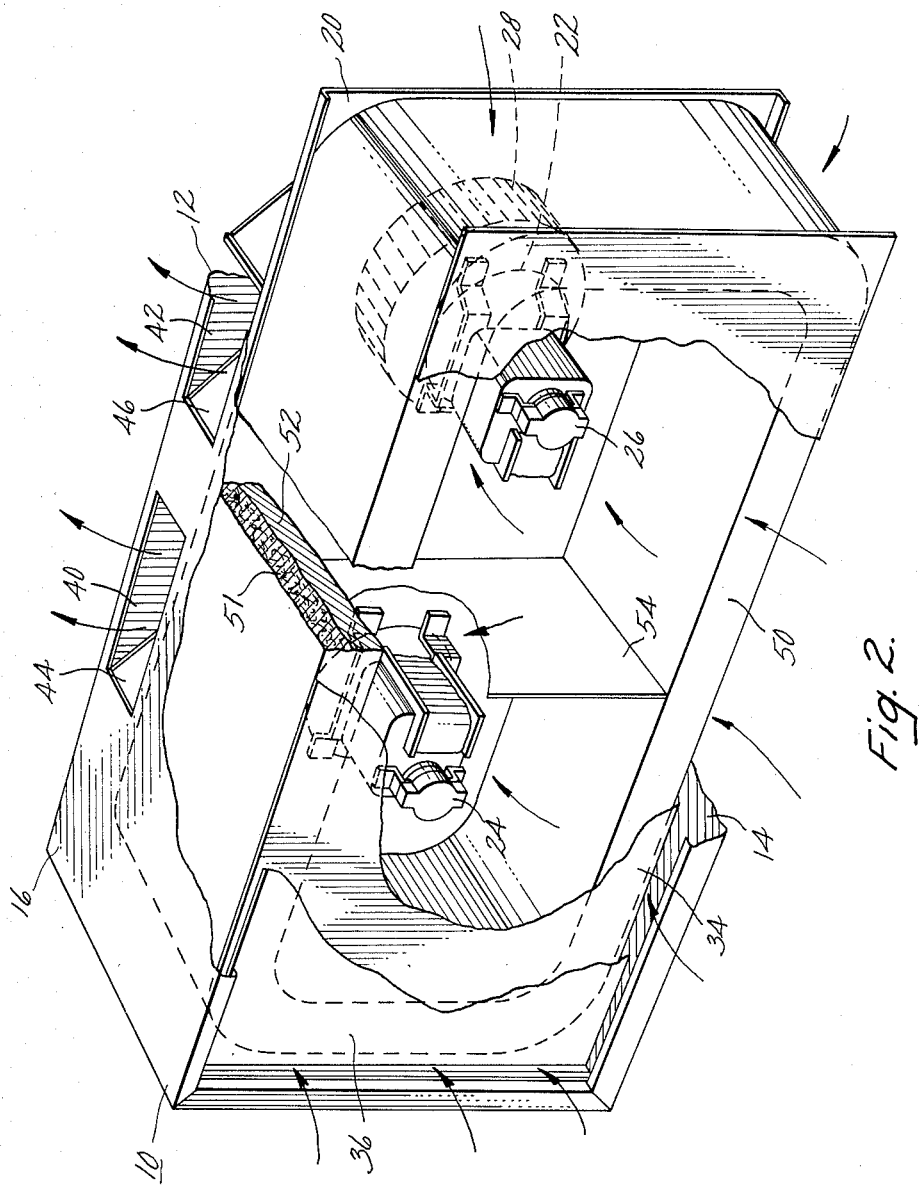
FIG. 2 is a view similar to that of FIG. 1 with the exception that the two circular cross-sectioned filters of FIG. 1 have been replaced by a single oblong shaped filter.

FIG. 2 shows an air purifier construction similar to that of FIG. 1, but with a modified filter arrangement. Instead of utilizing two separate circular filters there is shown a single filter having a somewhat rectangular cross-section and surrounding both motors 24 and 26. Also, the rectangular filter 50 does not have the pleated construction of the filters of FIG. 1, but instead is provided with an outer layer 51 of filter material, such as glass fiber and an inner layer 52 of charcoal or other odor removing material. It should of course be understood that pleated material may be employed if desired.

When two motor and fan systems are employed with only a single filter as shown in FIG. 2, it is possible that an undesirable loading condition may occur because the respective fans are pulling air from the same source. If the motors and fans are not identical, it is possible that one unit will pull more air than the other causing one motor to unload and the other to overload. When this happens, speeds change and the cycle reverses. To prevent such action, there is provided a baffle plate 54 separating the two motors and dividing the filter area into two compartments so that each motor pulls air only from its respective compartment. The baffle may be supported in any suitable fashion by support plate 20 or the imperforate plate 34.

Figure 3:
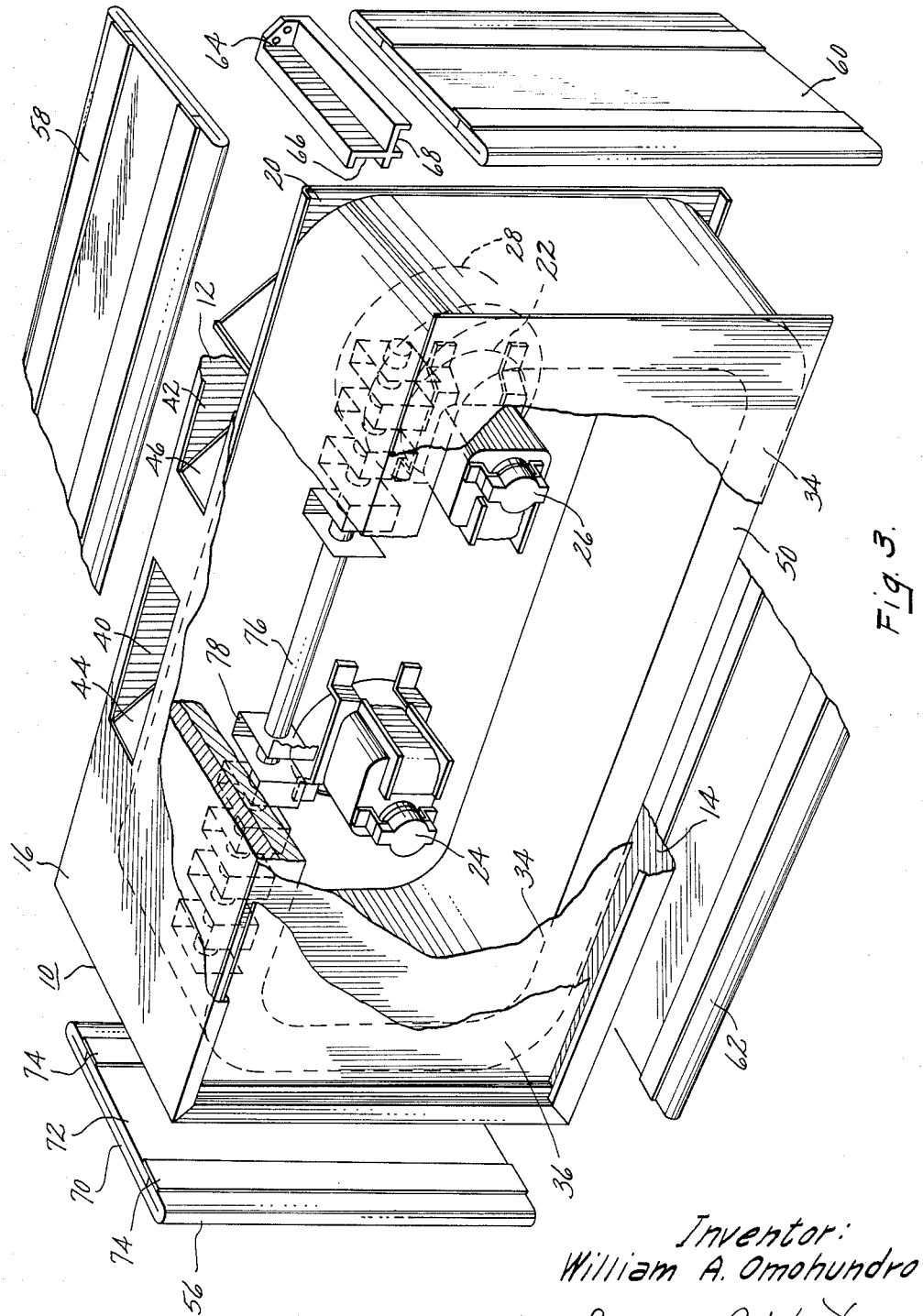
FIG. 3 is a further modification of the purifier of FIG. 2 incorporating an air purifying and ion emitting device, and further incorporating an alternate filter construction.

As a further embodiment of the invention, there is shown in FIG. 3 a filtering arrangement including four separate filter panels 56, 58, 60 and 62. Together the filter panels form a filter having a rectangular cross-section to surround both motors of the purifier. This assembly has the same advantages of the oblong filter design of FIG. 2, but the filter cost is reduced and the construction is less complicated.

The filter panels may be assembled into position by utilizing a unique angular bracket 64 mounted to the corner of support plate 20 by suitable fastening means. As can be seen from the drawing the bracket is provided with a pair of slots 66 and 68 each adapted to receive the end of one of the filter panels. For the bracket shown, one end of filter 58 is received within slot 66 and one end of filter panel 60 is received in slot 68. A similar arrangement is employed at each corner of the overall filter construction to support all four panels. Finally, the fiter panels are compressed by imperforate pate 34 against plate 20 to form an air seal between the plates and the filter panels.

The filter panels themselves have a flattened tubular construction of glass fiber or similar material, and a layer of charcoal may be inserted within the tube. As shown in connection with filter panel 56, the panel tube may be formed in an outer section 70 and an inner section 72 joined together by a pair of sealing strips 74. Such construction facilitates manufacture of the filter panels. Another feature of the filter panels is that the inner section 72 may be formed of a coarser material than section 70 so as to have little air resistance while yet preventing charcoal dust from collecting on down-stream components.

As another embodiment of the invention, there is shown in FIG. 3 an ultraviolet lamp 76 supported within the filter 50 by brackets (not shown) attached to support plate 20 or by other suitable mounting means. The ultraviolet lamp 76 is employed for two purposes which should be seperately considered.

First, it has been found that ultraviolet rays have efficacy to purify air by destroying certain bacteria. For such a function, it is desirable that as much air as possible be exposed to the ultraviolet bacteria destroying rays. By positioning the lamp 76 within the filter 50, in accordance with the invention, virtually the entire inner discharge surface of the filter is exposed to ultraviolet rays. Thus such an arrangement is very effective and efficient. Another advantage of positioning the lamp within the filter is that maximum space utilization is obtained in that the lamp may be incorporated into the unit without enlarging its exterior dimensions. In this connection, it should be realized that additional lamps may be placed within the filter if so desired, and various lamp shapes may be employed; however, the straight tubular lamp shown is the least expensive.

The other major function of the lamp 76 concerns the production of negative ions. Although there is still much to learn about the effect of air containing negative ions on humans, it is fairly well established that certain beneficial aspects are obtained. Accordingly, it is desirable that means be included to provide negative ions to be carried by the air stream being discharged into the surrounding room.

One method of producing ions is by photo emission wherein a body is bombarded with photons which are irradiated from a suitable source, such as ultraviolet lamp 76, to cause negative electricity or electrons to leave the body. These electrons attached themselves to molecules present in the air to form negative ions. To serve as the electron emitting body, there is provided a unique target construction 78 for the lamp 76. As can be seen from FIG. 3, the target 78 is composed of a strip of material provided with a plurality of holes of a size comparable to the diameter of the elongated ultraviolet lamp 76. As seen from the drawing, the strip of material is folded upon itself in sinuous fashion to align the holes to that the lamp may be inserted within the holes of the target. Such an arrangement maximizes the target area in close proximity to the lamp. The target 78 is preferably formed of tin or other suitable material which will emit electrons under photon bombardment.

Figure 4:
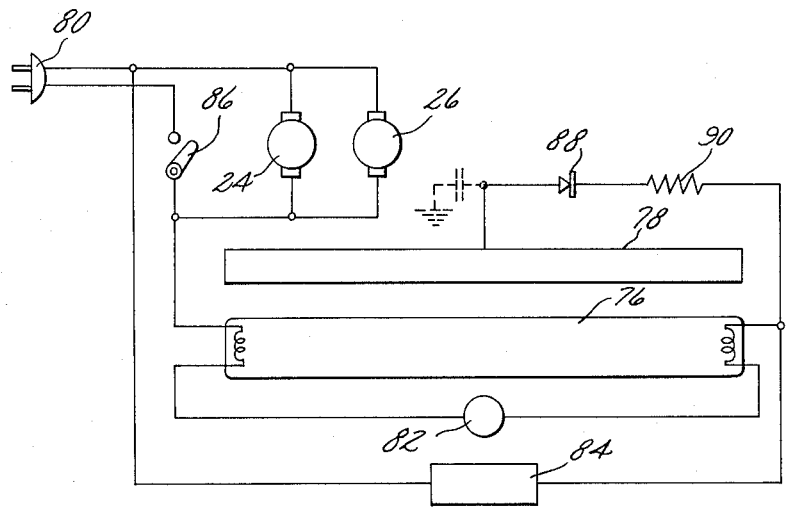
FIG. 4 is a circuit diagram of the electrical connection for the purifier of FIG. 3.

For a further description of the system, refer now to the circuit diagram of FIG. 4, where the ultraviolet lamp 76 is shown suitably connected to a standard 120 volt, 60 cycle, alternating current source by a conventional plug connector 80. A starter 82 and a ballast 84 are also connected in the circuit in a conventional manner for properly energizing the ultraviolet lamp 76. As shown, the fan motors 24 and 26 are connected in parallel with the ultraviolet lamp and a switch 86 is provided for simultaneously energizing the fan motors and the lamp.

With this arrangement photons from lamp 76 may bombard the target 78, which is schematically shown as simply a plate in FIG. 4 as opposed to the somewhat serpentine structure of FIG. 3. This photon bombardment causes electrons to leave the target and it is believed that these electrons attach themselves to gas molecules in the air to form ions.

To increase the number of electrons emitted from target 78 and thus increase the number of ions which may be formed in the surrounding air, the target 78 is connected to the line side of the ultraviolet lamp 76 through a diode 88 oriented with its cathode connected to the line and its anode to the target 78. A current limiting resistor 90 may be located in series with the diode and the line to eliminate shock hazard, and the parameters of the various components may be selected so that the target is on the average negative with respect to the lamp 76. With this construction, stray capacitance exists between the target 78 and its surroundings as illustrated by the dotted line phantom circuit in FIG. 4. This stray capacitance causes an alternating current voltage to be induced on the target, and this voltage is rectified by the diode 88. With such arrangement the negative polarization of the target repels electron space charges at the target to thereby greatly increase the number of ions generated by insuring that the electrons emitted and the ions formed do not fall to the target and return the electron to the target. In addition, with such an arrangement it has been found that adsorption of grease in a monomolecular layer on the emitting target does not cause a substantial decrease in the number of electrons emitted from the target. Apparently, the repulsion by the negative charge gives the electron enough energy to pass through the layer of contaminate. The foregoing concept of improved negative ion production is included in a copending application, Serial No. 115,349, filed June 7, 1961, by William A. Omohundro and George S. Dickinson, assigned to the same assignee as the present invention.

As mentioned, the ions thus formed are to be carried by the air stream into the surrounding room. It should be noted that the 360° perimetric air inlet of the invention permits the target and lamp to be positioned in various locations within the filter and yet an airflow in and around the target area is maintained.

While there has been shown and described specific embodiments of the invention, it is not desired that the invention be limited to the particular forms shown, and it is intended by the appended claims to cover all such changes and modifications which fall within the true spirit and scope of the invention.

What I claim is:

1. An air purifier comprising: a housing having a pair of side walls, a top wall, a bottom wall and a rear wall, a motor support plate extending between said side walls and said top and bottom walls parallel to said rear wall, said support plate having a pair of apertures positioned in laterally spaced relation, a pair of motors supported by said support plate positioned on one side of the support plate each with its drive shaft extending through a respective one of said apertures, a pair of fans positioned on the other side of said support plate between the support plate and said rear wall, each of said fans being mounted on a respective one of said shafts and adapted to draw air through said apertures, tubular shaped air purifying filter means surrounding said motors with one end of the filter means being positioned against said support plate and surrounding said apertures, air inlet means in said housing on the motor filter side of said support plate, air outlet means in said housing on the fan side of said support plate, a substantially imperforate plate compressed against the opposite end of said filter means, said imperforate plate being of such size to completely cover the said opposite filter end while being spaced from said top, bottom and side walls to define a 360° air inlet so that substantially all air reaching said fans is drawn through said filter means and said apertures.

2. An air purifier comprising: a housing having an elongated rectangular rear wall and four side walls attached to said rear wall forming a rectangular cross-section, said side walls having a depth dimension shorter than the shortest dimension of said rear wall so that said housing has a relatively flat elongated appearance, a rectangular motor support plate having a pair of apertures therein being positioned within said housing and extending between said side walls in parallel relation to said rear wall, a pair of electric motors supported by said support plate positioned on one side of the support plate each with its drive shaft extending through a respective one of said apertures, a pair of fans positioned on the opposite side of said support plate adjacent said rear wall and each mounted on a respective one of said shafts to draw air through said apertures, tubular filter means positioned in perpendicular relation to said support plate and surrounding said motors, an imperforate rectangular plate compressed against the end of said filter means remote from said support plate to compress said filter means against the support plate, said imperforate plate being sized to fit within the side walls of said housing and being slightly spaced from said side walls to form a perimetric air inlet, and air outlet means formed in said housing on the fan side of said support plate, said imperforate plate being sufficiently large to completely cover the end of said filter means remote from the support plate so that substantially all air reaching said fans is drawn through said air inlet, through said filter means and through said plate apertures.

3. An air purifier comprising: a housing having an elongated rectangular rear wall and four side walls attached to said rear wall forming a rectangular cross-section, said side walls having a depth dimension shorter than the shortest dimension of said end wall so that said housing has a relatively flat elongated shape, a rectangular motor support plate having an aperture therein being positioned within said housing and extending between said side walls in parallel relation to said rear wall, an electric motor supported by said support plate positioned on one side of the support plate with its drive shaft extending through said aperture, a fan positioned on the opposite side of said support plate adjacent said rear wall and mounted on said shaft to draw air through said aperture, an open ended tubular filter positioned in perpendicular relation to said support plate and surrounding said motor, an elongated tubular ultraviolet light positioned within the space defined by the inner surface of said filter, an imperforate rectangular plate positioned against the end of said filter remote from said support plate to compress said filter against the support plate, said imperforate plate being sized to fit within the side walls of said housing and being slightly spaced from said side walls to form a perimetric air inlet, air outlet means formed in said housing on the fan side of said support plate, said imperforate plate being sufficiently large to completely cover the opening defined by said filter so that substantially all air reaching said fan is drawn through said perimetric air inlet, through said filters, and through said plate aperture.

4. An air purifier comprising: a housing having an elongated rear wall and a plurality of side walls attached to said rear wall, a motor support plate having a pair of apertures therein being positioned within said housing and extending between said side walls in parallel relation to said rear wall, a pair of electric motors supported by said support plate positioned on one side of the support plate each with its drive shaft extending through a respective one of said apertures, a pair of fans positioned on the opposite side of said support plate adjacent said rear wall and each mounted on a respective one of said shafts to draw air through said apertures, an elongated open ended tubular filter positioned in perpendicular relation to said support plate and surrounding said motors, a baffle positioned within the space defined by the inner surface of said filter between the motors to form separate compartments for the motors, an imperforate rectangular plate positioned against the end of said filter remote from said support plate to compress said filter against the support plate, air inlet means in said housing on the filter side of the plate, air outlet means formed in said housing on the fan side of said support plate, said imperforate plate being sufficiently large to completely cover the end of the filter remote from the support plate so that substantially all air reaching said fans is drawn through said air inlet, through said filter, and through said plate apertures.

5. An air purifier comprising: an elongated housing having a rear wall and a plurality of side walls forming a rectangular cross-section, a support plate having a pair of apertures therein being positioned within said housing and extending between said side walls, a pair of motors supported by said support plate positioned on one side of the support plate each with its drive shaft extending through a respective one of said apertures, a pair of fans positioned on the opposite side of said support plate each mounted on a respective one of said shafts to draw air through said apertures, air inlet means formed in said housing on the motor side of said support plate, air outlet means formed in said housing on the fan side of said support plate, a plurality of flattened tubular filter elements each positioned in perpendicular relation to said plate and surrounding said motors to form a rectangular filter, a plurality of angular brackets each mounted to a respective corner of said support plate, each of said brackets having a pair of mutually perpendicular slots for receiving a respective edge of two of said filter elements, and an imperforate plate positioned against the edges of said filter elements remote from said support plate, said imperforate plate being sufficiently large to completely cover the opening defined by said filters so that substantially all air reaching said fans is drawn through said filter and said plate apertures.

References Cited by the Examiner
UNITED STATES PATENTS

| | | | |
|---|---|---|---|
| 1,807,032 | 5/1931 | Gieseler | 55—471 XR |
| 1,838,505 | 12/1931 | Shurtleff. | |
| 2,021,437 | 11/1935 | Walsh | 55—471 XR |
| 2,251,649 | 8/1941 | Wichmann | 55—473 X |
| 2,313,676 | 3/1943 | Shaver | 55—471 XR |
| 2,362,933 | 11/1944 | Schaefer | 55—471 XR |
| 2,594,688 | 4/1952 | Shapiro | 55—467 |
| 2,629,587 | 2/1953 | Tignor | 55—482 XR |
| 2,638,644 | 5/1953 | Rauhut | 55—279 XR |
| 2,845,139 | 7/1958 | Berberich et al. | 55—471 |
| 2,935,156 | 5/1960 | Schofield | 55—279 |
| 3,071,828 | 1/1963 | Cornell | 55—279 XR |
| 3,072,978 | 1/1963 | Minto | 55—279 XR |

ROBERT F. BURNETT, *Primary Examiner.*

HARRY B. THORNTON, *Examiner.*